Figure 5:
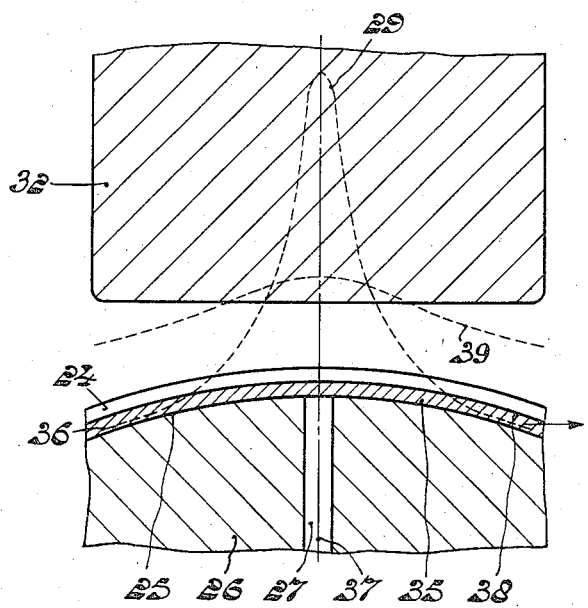

Sept. 30, 1958   J. J. WENT ET AL   2,854,524
APPARATUS FOR MAGNETICALLY RECORDING
ON A CARRIER OF MAGNETIC MATERIAL
Filed Jan. 10, 1952   2 Sheets-Sheet 1
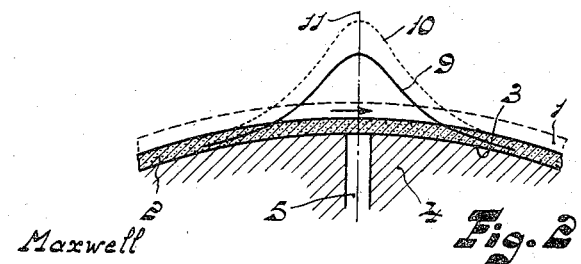
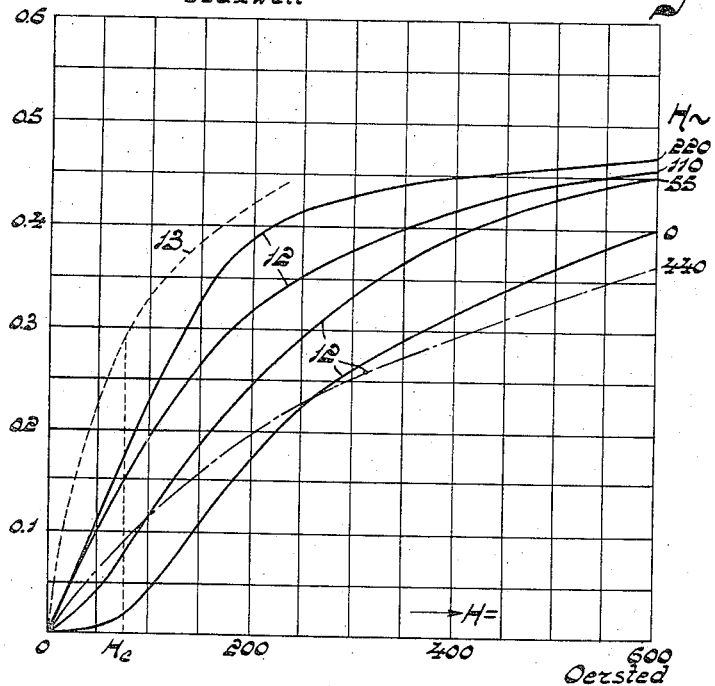
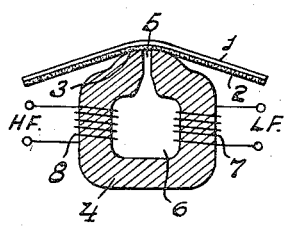
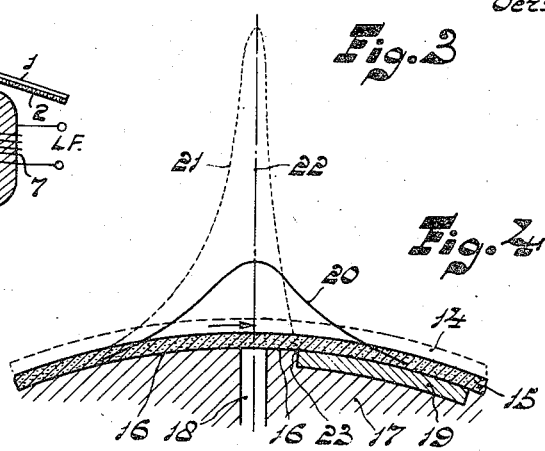
INVENTORS
Jan Jacobus Went
Willem Klaas Westmijze
By       Agent Sept. 30, 1958  J. J. WENT ET AL  2,854,524
APPARATUS FOR MAGNETICALLY RECORDING
ON A CARRIER OF MAGNETIC MATERIAL
Filed Jan. 10, 1952  2 Sheets-Sheet 2

INVENTORS
Jan Jacobus Went
Willem Klaas Westmijze
By
Agent

United States Patent Office 2,854,524
Patented Sept. 30, 1958

2,854,524

APPARATUS FOR MAGNETICALLY RECORDING ON A CARRIER OF MAGNETIC MATERIAL

Jan Jacobus Went and Willem Klaas Westmijze, Eindhoven, Netherlands, assignors, by mesne assignments, to North American Philips Company, Inc., New York, N. Y., a corporation of Delaware Application January 10, 1952, Serial No. 265,868

Claims priority, application Netherlands January 17, 1951

4 Claims. (Cl. 179—100.2)

This invention relates both to a method of registering magnetic records, through the use of a magnetic circuit having a gap, on a tape- or wire-like carrier passing the gap and to a magnetic circuit for registering magnetic records by this method.

When registering magnetic sound records in a carrier in the said manner it is the standard practice to develop together with a field of acoustic frequencies (L. F.-field) an auxiliary field in the magnetic circuit. Instead of utilizing the older technique of using a direct field to reduce the noise level of the carrier, the auxiliary field is generally constituted at present by an alternating field having a frequency (H. F.-field) falling beyond the frequency range to be registered. However, before the carrier is registered in this fashion, it is exposed to a very powerful magnetic alternating field, referred to hereinafter as the "erasing field," which substantially de-magnetizes the carrier material. The strength of the H. F.-auxiliary field which, jointly with the L. F.-field of acoustic frequencies subsequently acts on the carrier, is chosen to be considerably lower than the strength of the erasing field. The correct value of this H. F.-field must be ascertained experimentally for whichever magnetizable carrier material is used. This correct value may be found by measuring the magnetic flux stored in the carrier after passing the recording gap as a function of the strength of the L. F.-field for different values of the H. F.-field strength. It is thus found that for each kind of magnetizable carrier material there is a particular value for the H. F.-field, which provides a substantially straight characteristic curve. At lower values of the H. F.-field, the characteristic curve has a more or less S-shaped curvature and at higher values difficulties arise in view of the higher frequencies which must be recorded. Consequently it is always necessary in determining the correct strength of the H. F.-field component to allow for the type of magnetizable carrier material and vice versa.

According to the method of the invention, the H. F.-field set up at the gap is given at least such a strength that in the absence of the L. F.-field the magnetic carrier material is substantially demagnetized. Moreover, means are provided which causes the strength of the H. F.-field beyond the gap viewed in the direction of the carrier movement to decrease more rapidly than the L. F.-field. Experiments undertaken by the applicants on different kinds of magnetic carrier material show that through use of the method according to the invention, the strength of the H. F.-field component can be adjusted to one value for all types of magnetic carrier material which are used.

When carrying out the method according to the invention, the strength of the auxiliary field is preferably chosen to be equal to that of the erasing field. This provides an additional advantage since the H. F.-erasing field may be omitted and thus the recording device is simplified. Since in the well-known method the H. F.-auxiliary field must have a particular strength for every kind of magnetic carrier material to minimize the distortion, and since this strength is materially less than that of the erasing field, the erasing field cannot be omitted in the known method, if the carrier is to be protected against any previous magnetic history.

A further advantage of the method of the present invention is that a more acceptable frequency curve of the magnetizable material of the carrier can be obtained or that the carrier speed can be sharply reduced. As a matter of fact, the capacity of any magnetic records in registering higher acoustic frequencies, is governed by the declining slope of the H. F.-field; that is by the speed at which the magnetic field strength decreases when the carrier passes the gap. The latter factor can be acted upon in accordance with the invention.

The declining slope of the H. F.-field is preferably such that, viewed in the direction of movement of the carrier, the strength of the H. F.-field decreases to below the value of the coercive force of the magnetic carrier material before the L. F.-field decreases appreciably.

Moreover, if the method of the invention is used, and the strength of the H. F.-field exceeds a given minimum value, the same reproduction-curve is invariably produced at the different depths of the carrier layer to be magnetized irrespsective of the accurate adjustment of the H. F.-field. This is very important for distortion-free reproduction since, due to the above-mentioned experiments undertaken on different types of magnetic carrier material, it has been found that the remanence of the material found subsequent to a given magnetization brought about by different strength L. F.-fields of very low-frequency combined with a strong alternating field of comparatively high-frequency which saturates the material and whose strength continuously decreases sooner than that of the L. F.-field, is located on a curve referred to hereinafter as the "ideal" remanence curve. This curve is substantially linear up to a third of the maximum remanence. In order that in the method according to the invention, it may be possible to approximate in practice the "ideal remanence curve" with the carrier of magnetic sound records, the magnetic circuit beyond the gap viewed in the direction of the carrier movement and at the surface of contact with the carrier is provided with a layer of electrically good conducting material whose thickness exceeds the penetration depth of the H. F.-field and is less than the penetration depth of the L. F.-field. The difference between the maximum acoustic frequency and the frequency of the H. F.-field is chosen to be such that after the gap is passed the auxiliary field is compelled by the "skin effect" of the said layer to decline rapidly, whereas the L. F.-field is not affected by the layer at that area. Obviously, the material of the magnetic circuit must be sufficiently permeable to the H. F.-field and preferably the magnetic circuit is therefore constituted by ferrite material known as "Ferroxcube" and the layer by copper. "Ferrite material" is understood to mean material primarily constituted by substantially homogeneous crystals of a compound $MFe_2O_4$, where M designates a bivalent metal, such for example as Cu, Mg or Mn, or by substantially homogeneous mixed crystals of these components.

In addition, it may be readily seen and it has also been found experimentally that as a result of the higher sensitivity, the amplitude of the frequencies of the recorded acoustic frequency band has a higher value in the method according to the invention than in the use of the conventional method.

In order that the invention may be more clearly understood and readily carried into effect, it will now be described more fully with reference to the accompanying drawing, wherein—

Figure 6:
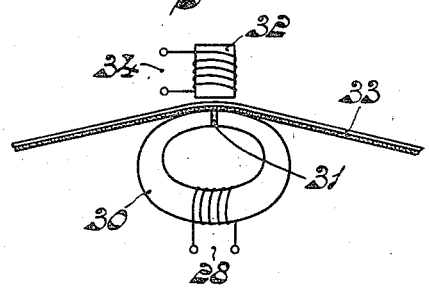

Fig. 1 shows diagrammatically how magnetic records are provided on a tape-like carrier in the usual manner;

Fig. 2 shows diagrammatically on an enlarged scale, the variation of the leakage field strength of the H. F.- and L. F.-components outside the part of the magnetic circuit shown in Fig. 1;

Fig. 3 shows several graphs recorded with reference to a tape provided with a layer in which small particles of, say, $Fe_2O_3$ are distributed as evenly as possible, the magnetic tension being plotted as a function of the field strength of the direct L. F.-field at different values of the H. F.-field strength;

Fig. 4 shows the variation of the leakage field strength of the H. F.- and L. F.-fields when carrying out the method according to the invention, the fields being present at the airgap, outside the magnetic circuit which is shown on an enlarged scale;

Fig. 5 shows the variation of the leakage field strength of the H. F.- and L. F.-fields when carrying out a modification of the method according to the invention, the L. F.-field being generated by the L. F.-coil in a magnetic core, which in combination with a magnetic head constitutes the magnetic circuit; and Fig. 6 shows diagrammatically how magnetic records are provided on a tape-like carrier when carrying out the modification of the method according to the invention, shown in Fig. 5.

In Fig. 1, a tape-like carrier 1 provided with a layer of magnetizable material 2 constituted by pulverulent $\gamma-Fe_2O_3$ is guided transversely over a gap 5 across which the magnetic circuit is interrupted, to provide magnetic sound records in the usual manner. The layer to be magnetized engages the curved guiding surface 3 of a magnetic circuit 4. In addition, the magnetic circuit comprises an aperture 6 in which windings 7 and 8 which supply the magnetizing current are housed. The input terminals of the winding 7 have supplied to them an electric current of acoustic frequency and the terminals of the winding 8 have supplied to them an electric current the frequency of which exceeds the acoustic frequency band so that the L. F.- and the H. F.-fields are produced in the magnetic circuit.

In Fig. 2 is illustrated the manner in which the strength of the leakage field 9 of the L. F.-field component and that of the leakage field 10 of the H. F.-field component increase simultaneously upon displacement in the direction of the carrier movement towards the gap 5, have their maximum value in the plane of symmetry 11 of the gap, and decrease simultaneously when withdrawing from the gap. Before the tape passes the gap 5 in the said circuit, the tape, in order to erase any previous records on it, has passed an alternating field of such a strength that the material of the tape is fully demagnetized. The strength of the H. F.-auxiliary field is lower than that of the erasing field and is ascertained experimentally with reference to a graph as shown in Fig. 3.

The curves 12 of Fig. 3 represent so-called "remanence curves." That is, they register the remanence left subsequent to magnetization by different strengths of magnetic direct fields combined with different strengths of alternating fields of 0—55—110—220 and 440 oersted; care being taken to see that the direct and alternating fields decrease at the same time. These curves consequently indicate the situation as set up during the customary H. F.-premagnetization. The measured remanence determines the strength of the signal which is reproduced by the reproducing circuit. The curves of Fig. 3 show that for a given strength of the H. H.-auxiliary field, to wit, in the present instance at 220 oersted, a substantially straight characteristic curve is produced, whereas at lower and higher values thereof the characteristic curve is curved. With $\gamma-Fe_2O_3$ as the magnetizable layer of the tape under consideration, only a H. F.-auxiliary field strength of 220 oersted is suitable for registration free from distortion. The saturation value for this tape lies at about 1500 oersted so that the H. F.-auxiliary field strength is materially less than the erasing field strength.

Fig. 3 also shows in broken lines a curve 13, the so-called "ideal remanence curve." The curve 13 is obtained by measuring the magnetic tension as a function of the L. F.-field (direct field) at a saturation strength of the H. F.-field; care being taken to see that the H. F.-field declines; that is to say, that, viewed in the direction of the carrier movement, its strength decreases sooner than the L. F.-field. Since the alternating field has become zero while the direct field is still present, the curve 13 represents the hysteresis-free magnetization. It is found that the "ideal remanence curve" is linear up to a third of the remanence value. The importance of the ideal remanence curve will be evident in the discussion of the method of the present invention.

In Fig. 4, a tape 14 provided with a magnetizable layer 15 of the same material as that used for this purpose in the conventional method, is guided, along a curved surface of contact 16 of a magnetic circuit 17 made of "Ferroxcube," transversely over a gap 18 by which the magnetic circuit is interrupted. The surface of contact with the carrier beyond the gap viewed in the direction of the tape movement, is occupied throughout its width and to a given depth by a small plate 19 of copper. Fields in the magnetic circuit are developed in a manner similar to that shown in Fig. 2 so that at the gap 18 a leakage field of acoustic frequency and a high-frequency leakage field are produced, the latter having a strength such that in the absence of the L. F.-field the tape is substantially demagnetized. The variation of the field strength of the L. F.-component is diagrammatically shown by the curve 20 and that of the H. F.-field by the curve 21. Thus, when the tape 14 moves in the direction indicated a magnetizable particle in the layer 15 of the tape will be exposed to a H. F.- and a L. F.-field, said fields increasing in strength at the same time during the travel of the tape, reaching a maximum value approximately in the plane of symmetry 22 of the gap 18. The H. F.-field 21 then decreases in strength more rapidly than the L. F.-field 20 so that directly beyond a point 23, when the tape moves over the copper plate 19, only a L. F.-field is left. So long as this H. F.-auxiliary field has a strength which is sufficient to saturate the material of the layer 15, the remanence of the tape will be located on a point of the "ideal remanence curve" 13 of Fig. 3 irrespective of the strength of the H. F.-field. This explains the fact that when using the method according to the invention for the circuit described, the adjustment of the H. F.-field is not critical, because above the saturation value operation is always effected on the "ideal" remanence curve. Since the H. F.-field has already sufficient strength to delete the magnetic previous history of the tape, this auxiliary field will be sufficient without further expedients. Since the rate of decrease of the H. F.-field determines the registration of the higher frequencies of the acoustic frequency band, by increasing this slope the frequency characteristic curve may be improved or the speed of travel of the tape may be reduced.

Since the strength of the H. F.-field can be increased without inconvenience to an extent such that when tapes of different types of magnetizable material are used, saturation thereof always occurs in the absence of the acoustic signal, operation may be effected with the same H. F.-amplitude. An additional effect of this method is that at different depths in the tape operation is invariably effected with the same distortion characteristic curve, that is to say, the "ideal remanence curve" 13. This assists in providing distortion-free reproduction.

Fig. 3 shows in addition that in the method according to the invention, the strength of the magnetic signal recorded on the carrier is independent of the value of the auxiliary field strength used (operation is invariably on the "ideal" remanence curve), whereas in the known method the signal strength at higher values than the auxiliary field strengths used varies with the value thereof.

In Fig. 5, a tape 24 such as tape 14 of Fig. 4, is guided along a curved surface of contact 25 of a conventional magnetic head 26 made of "Ferroxcube," transversely over a gap 27. Windings 28, represented in Fig. 6, supply the H. F.-magnetizing current, the latter bringing about a H. F.-leakage field 29, which has a marked maximum value. Opposite the surface 25 of the head 26, and arranged at a fixed distance therefrom, is a magnetic core 32, made of "Ferroxcube," which in combination with the head 26 constitute the magnetic circuit. The arrangement of the core 32 with respect to the carrier and the head is shown in Fig. 6. Windings 28 have been provided at the head 30 of Fig. 6. Opposite the gap 31 is the core 32. The carrier 33 guided by the head 30 is led between said head and the core 32. Windings 34 supply the L. F.-magnetizing current, bringing about a L. F.-stray-field, which due to the described arrangement of the core 32 with respect to the head 30, is substantially homogeneous in the surroundings of the gap 31. The L. F.-stray-field is shown at 39 in Fig. 5. As will readily appear from Fig. 5 a magnetizable particle 35 of the magnetizable layer 36, present in the vicinity of the plane of symmetry 37 of the gap 27 and the core 32, will be subjected simultaneously to the high frequency field 29 and the low frequency field 39. A particle 38 of the layer 36, present at a certain distance apart from the plane of symmetry 37, however, will be substantially subjected to the low frequency field 39; the high frequency field 29 at that place being negligibly small with respect to the low frequency field 39.

Although the invention is described with reference to a record on a tape-like carrier, it is possible without further expedients to apply the invention to a wire-like carrier.

What we claim is:

1. Apparatus for magnetically recording on a carrier of magnetic material, comprising a core member having two confronting pole pieces arranged to have said carrier pass thereacross from one pole to the other in a given direction, a gap between the confronting faces of said pole pieces across which said carrier is to pass, means for applying a high frequency current to said core member to establish a high frequency field across said gap, said high frequency current having an intensity at which the field strength of said high frequency field has a value sufficient to effect demagnetization of said material in the absence of a low frequency field, means for applying a low frequency current varying in accordance with an intelligence signal to said core member to establish a low frequency field across said gap, and attenuating means located in a surface of said core member adjacent said carrier in proximity to the pole piece beyond said gap viewed in said given direction, said attenuating means being effective solely for attenuating the high frequency field on one side of said gap relative to the high frequency field on the other side of said gap.

2. Apparatus as claimed in claim 1, wherein said core member primarily comprises a ferrite material composed of substantially homogeneous crystals of a compound $MFe_2O_4$ where M designates at least one bivalent metal and said attentuating means comprises a copper material.

3. Apparatus for magnetically recording on a carrier of magnetic material, comprising a core member having two confronting pole pieces arranged to have said carrier pass thereacross from one pole to the other in a given direction, a gap between the confronting faces of said pole pieces across which said carrier is to pass, means for applying a high frequency current to said core member to establish a high frequency field across said gap, said high frequency current having an intensity at which the field strength of said high frequency field has a value sufficient to effect demagnetization of said material in the absence of a low frequency field, means for applying a low frequency current varying in accordance with an intelligence signal to said core member to establish a low frequency field across said gap, and means for attenuating the high frequency field on one side of said gap relative to the high frequency field on the other side of said gap comprising an electrically conductive member disposed in a surface of said core member adjacent said carrier in proximity to the pole piece beyond said gap viewed in said given direction.

4. Apparatus for magnetically recording on a carrier of magnetic material, said apparatus comprising a magnetic circuit provided with a gap across which said carrier is to pass in a given direction, means to apply a low-frequency current varying in accordance with an intelligence signal to said circuit to establish a low-frequency field across said gap having a field strength which decreases at a given rate in the given direction of movement beyond said gap, means to apply a high-frequency current to said circuit to establish a high-frequency field across said gap, said high-frequency current having an intensity at which the field strength of said high-frequency field has a value sufficient to effect demagnetization of said material in the absence of said low-frequency field, and means located in a surface of said core member adjacent said carrier in proximity to a pole piece effective solely with respect to said high-frequency field to diminish the field strength of said high-frequency field in the given direction at a rate substantially greater than said given rate.

References Cited in the file of this patent

UNITED STATES PATENTS

| | | |
|---|---|---|
| 2,431,541 | Camras | Nov. 25, 1947 |
| 2,628,285 | Camras | Feb. 10, 1953 |
| 2,658,114 | Buhrendorf | Nov. 3, 1953 |
| 2,810,020 | Schwarz et al. | Oct. 15, 1957 |

FOREIGN PATENTS

| | | |
|---|---|---|
| 874,773 | France | May 18, 1942 |
| 881,343 | France | Jan. 22, 1943 |